US011926531B2

(12) United States Patent
Takada et al.

(10) Patent No.: US 11,926,531 B2
(45) Date of Patent: Mar. 12, 2024

(54) FLAKY ALUMINA PARTICLES AND METHOD FOR PRODUCING FLAKY ALUMINA PARTICLES

(71) Applicant: DIC Corporation, Tokyo (JP)

(72) Inventors: Shingo Takada, Sakura (JP); Kazuo Itoya, Sakura (JP); Jian-Jun Yuan, Sakura (JP); Takayuki Kanematsu, Sakura (JP); Masamichi Hayashi, Sakura (JP); Fumihiko Maekawa, Sakura (JP); Yoshiyuki Sano, Sakura (JP)

(73) Assignee: DIC Corporation, Tokyo (JP)

( * ) Notice: Subject to any disclaimer, the term of this patent is extended or adjusted under 35 U.S.C. 154(b) by 48 days.

(21) Appl. No.: 17/259,932

(22) PCT Filed: Jul. 26, 2018

(86) PCT No.: PCT/JP2018/028068
§ 371 (c)(1),
(2) Date: Jan. 13, 2021

(87) PCT Pub. No.: WO2020/021675
PCT Pub. Date: Jan. 30, 2020

(65) Prior Publication Data

US 2021/0291272 A1 Sep. 23, 2021

(51) Int. Cl.

| | |
|---|---|
| ***B32B 5/30*** | (2006.01) |
| ***B22F 1/05*** | (2022.01) |
| ***B22F 9/30*** | (2006.01) |
| ***C01F 7/442*** | (2022.01) |
| ***C04B 35/185*** | (2006.01) |
| ***C04B 35/65*** | (2006.01) |

(52) U.S. Cl.
CPC ................ *C01F 7/442* (2013.01); *B22F 1/05* (2022.01); *B22F 9/30* (2013.01); *B32B 5/30* (2013.01); *C04B 35/185* (2013.01); *C04B 35/65* (2013.01); *B22F 2302/253* (2013.01); *B22F 2302/256* (2013.01); *B22F 2304/10* (2013.01); *B32B 2255/04* (2013.01)

(58) Field of Classification Search
None
See application file for complete search history.

(56) References Cited

U.S. PATENT DOCUMENTS 4,595,665 A * 6/1986 Takayama ........... C04B 41/5025 428/701
5,312,791 A * 5/1994 Coblenz ................ C04B 35/111 501/153
6,638,888 B1 10/2003 Peratello et al.
2001/0043910 A1* 11/2001 Fukuda ................ A61K 8/0254 106/401
2009/0326097 A1 12/2009 Fujita et al.
2012/0226058 A1* 9/2012 Pak ...................... B01J 35/1076 502/348
2014/0256543 A1 9/2014 Khosravi-Mardkhe et al.
2016/0264832 A1 9/2016 Yuan et al.

FOREIGN PATENT DOCUMENTS

| | | |
|---|---|---|
| CN | 101501124 | 8/2009 |
| CN | 104718162 | 6/2015 |
| CN | 107074573 | 8/2017 |
| CN | 106103347 | 4/2018 |
| EP | 3778486 | 2/2021 |
| JP | 05-170525 A * | 7/1993 |
| JP | H08323925 | 12/1996 |
| JP | 109059018 | 3/1997 |
| JP | H0977513 | 3/1997 |
| JP | 2002249315 | 9/2002 |
| JP | 2003192338 | 7/2003 |
| JP | 2008056556 | 3/2008 |
| JP | 2009035430 | 2/2009 |
| JP | 2010285294 | 12/2010 |
| JP | 2016166374 | 9/2016 |
| JP | 2016222501 | 12/2016 |
| KR | 20130129825 | 11/2013 |

OTHER PUBLICATIONS

English translation of JP 05-170525 (originally published Jul. 9, 1993) from PE2E.*
Basil R. Marple, et al., "Mullite/Alumina Particulate Composites by Infiltration Processing." Journal of the American Ceramic Society, vol. 72, No. 11, Nov. 1989, pp. 2043-2048.
Geoff E. Fair, et al., "Ceramic Composites with Three-Dimensional Architectures Designed to Produce a Threshold Strength—I. Processing." Journal of the American Ceramic Society, vol. 88, No. 5, Apr. 29, 2005, pp. 1158-1164.
"International Search Report (Form PCT/ISA/210)" of PCT/JP2018/028068, dated Oct. 23, 2018, with English translation thereof, pp. 1-4.
"Office Action of Japan Counterpart Application", dated Jun. 9, 2020, with English translation thereof, p. 1-p. 5.
"Search Report of Europe Counterpart Application, Application No. 18927357.6", dated Feb. 25, 2022, p. 1-p. 7.

(Continued)

*Primary Examiner* — George Wyszomierski
(74) *Attorney, Agent, or Firm* — JCIPRNET

(57) ABSTRACT

Flaky alumina particles including mullite in a surface layer of the flaky alumina particles. A method for producing flaky alumina particles including forming a mixture by mixing together an aluminum compound that contains elemental aluminum, a molybdenum compound that contains elemental molybdenum, and silicon or a silicon compound that contains elemental silicon, the aluminum compound being in an amount greater than or equal to 50 mass %, calculated as $Al_2O_3$, the molybdenum compound being in an amount less than or equal to 40 mass %, calculated as $MoO_3$, the silicon or the silicon compound being in an amount of 0.5 mass % or greater and less than 10 mass %, calculated as $SiO_2$, relative to a total mass of the flaky alumina particles taken as 100 mass %; and firing the mixture.

9 Claims, No Drawings

(56) References Cited

OTHER PUBLICATIONS

"Office Action of Korea Counterpart Application No. 10-2020-7031704", dated Sep. 19, 2022, with English translation thereof, pp. 1-7.

Office Action of China Counterpart Application, Application No. 201880094746.X, with English translation thereof, dated Jun. 21, 2022, pp. 1-11.

Liyun Cao et al., "Carbon/Carbon Composite AlPO4 Anti-Oxidation Ceramic Coating Structure", Northwestern Polytechnical University Press Co. Ltd., pp. 1-12, 2017.

Zhenxin Gao et al., "Skateboard Composition and Microstructure", Metallurgical Industry Press, pp. 1-18, 2012.

L. Favaro et al., "Experimental and ab initio infrared study of $\chi$-, $\kappa$- and $\alpha$-aluminas formed from gibbsite", Journal of Solid State Chemistry, Apr. 2010, pp. 901-908.

"Office Action of China Counterpart Application No. 201880094746.X", dated Nov. 22, 2022, with English translation thereof, pp. 1-9.

* cited by examiner

FLAKY ALUMINA PARTICLES AND METHOD FOR PRODUCING FLAKY ALUMINA PARTICLES

CROSS-REFERENCE TO RELATED APPLICATION

This application is a 371 application of an international PCT application serial no. PCT/JP2018/028068, filed on Jul. 26, 2018. The entirety of the above-mentioned patent application is hereby incorporated by reference herein and made a part of this specification.

TECHNICAL FIELD

The present invention relates to flaky alumina particles and a method for producing the flaky alumina particles.

BACKGROUND ART

Alumina particles, which are an inorganic filler, are used in various applications. Among others, flaky alumina particles, which have a high aspect ratio, have particularly excellent thermal properties, optical properties, and the like compared with spherical alumina particles, and, therefore, a further improvement in the performance of flaky alumina particles is desired.

In the related art, various flaky alumina particles having a shape characteristic, such as a particular major dimension or thickness, are known; such a characteristic was designed to improve the above-described inherent properties of flaky alumina particles, dispersibility, and the like (PTL 1 and 2). Furthermore, production methods in which a shape of flaky alumina particles is controlled to increase an aspect ratio thereof are known. Examples of the production methods include a method in which hydrothermal synthesis is performed with the addition of a phosphoric acid compound, which is used as a shape control agent (PTL 3); and a method in which firing is performed with the addition of a silicofluoride (PTL 4).

Another known method is a method for producing flaky alumina in which silicon or a silicon compound that contains elemental silicon is used as a crystallinity control agent in the production of flaky alumina (PTL 5).

CITATION LIST

Patent Literature

PTL 1: Japanese Unexamined Patent Application Publication No. 2003-192338

PTL 2: Japanese Unexamined Patent Application Publication No. 2002-249315

PTL 3: Japanese Unexamined Patent Application Publication No. 9-59018

PTL 4: Japanese Unexamined Patent Application Publication No. 2009-35430

PTL 5: Japanese Unexamined Patent Application Publication No. 2016-222501

SUMMARY OF INVENTION

Technical Problem

Unfortunately, these flaky alumina particles may wear out a mixer, conveyor, cutter, and the like because of the high hardness of alumina and, therefore, may degrade or break these devices. In addition, the frequency of occurrence of unintentional incorporation of the worn or broken pieces may increase.

The present invention has been made in view of such circumstances, and an object of the present invention is to provide flaky alumina particles that are unlikely to wear out devices compared with flaky alumina particles of the related art.

Solution to Problem

The present inventors diligently performed studies to solve the above-described problems and, consequently, made it possible to obtain flaky alumina particles that include, in a surface layer thereof, mullite, which has a lower hardness than alumina. Accordingly, the present invention was completed. Specifically, the present invention is as follows.

(1) Flaky alumina particles including mullite in a surface layer of the flaky alumina particles.

(2) The flaky alumina particles according to (1), wherein a molar ratio [Si]/[Al], which is a ratio of moles of Si to moles of Al, as determined by XPS analysis, is greater than or equal to 0.15.

(3) The flaky alumina particles according to (1) or (2), wherein, as determined by XRD analysis, a ratio of a peak intensity of the mullite observed at $2\theta=26.2\pm0.2°$ to a peak intensity of a (104) face of α-alumina observed at $2\theta=35.1\pm0.2°$ is greater than or equal to 0.02.

(4) The flaky alumina particles according to any one of (1) to (3), wherein the flaky alumina particles have a density of 3.7 $g/cm^3$ or greater and 4.1 $g/cm^3$ or less.

(5) The flaky alumina particles according to any one of (1) to (4), wherein a molar ratio [Si]/[Al], which is a ratio of moles of Si to moles of Al, as determined by XRF analysis, is less than or equal to 0.04.

(6) The flaky alumina particles according to (1) to (5), wherein the flaky alumina particles have a thickness of 0.01 to 5 μm, an average particle diameter of 0.1 to 500 μm, and an aspect ratio of 2 to 500.

(7) The flaky alumina particles according to any one of (1) to (6), further including molybdenum.

(8) The flaky alumina particles according to any one of (1) to (7), wherein the flaky alumina particles have a pH of an isoelectric point of 2 to 6 as determined by measurement of a zeta potential, the isoelectric point being a point at which a potential is zero.

(9) A method for producing the flaky alumina particles according to any one of (1) to (8), the method including forming a mixture by mixing together an aluminum compound that contains elemental aluminum, a molybdenum compound that contains elemental molybdenum, and silicon or a silicon compound that contains elemental silicon, the aluminum compound being in an amount greater than or equal to 50 mass %, calculated as $Al_2O_3$, the molybdenum compound being in an amount less than or equal to 40 mass %, calculated as $MoO_3$, the silicon or the silicon compound being in an amount of 0.5 mass % or greater and less than 10 mass %, calculated as $SiO_2$, relative to a total mass of the flaky alumina particles taken as 100 mass %; and firing the mixture.

(10) The method for producing the flaky alumina particles according to (9), wherein the mixture further includes a potassium compound.

Advantageous Effects of Invention

The present invention provides flaky alumina particles that are unlikely to wear out devices compared with flaky alumina particles of the related art. This is achieved by the presence of mullite in a surface layer of the flaky alumina particles.

DESCRIPTION OF EMBODIMENTS

The following description describes in detail flaky alumina particles and a method for producing the flaky alumina particles according to embodiments of the present invention.

<Flaky Alumina Particles>

According to an embodiment, flaky alumina particles include mullite in a surface layer thereof. Furthermore, the flaky alumina particles may include molybdenum. In addition, the flaky alumina particles may include one or more impurities from a raw material, a shape control agent, or the like provided that the effects of the present invention are not impaired. Note that the flaky alumina particles may further include an organic compound and/or the like.

By virtue of the presence of mullite in the surface layer, the flaky alumina particles of the embodiment are unlikely to wear out devices compared with flaky alumina particles of the related art. Alumina is a substance having a Mohs hardness of 9 and is classified as a very hard substance. Thus, a problem has been encountered in that flaky alumina particles of the related art wear out a device that is used, for example, for the production of a product that includes the flaky alumina particles. On the other hand, mullite has a Mohs hardness of 7.5. Accordingly, since the flaky alumina particles of the embodiment include mullite in the surface layer, devices come into contact with the mullite present in a surface rather than with the alumina of the flaky alumina particles. As a result, the wearing out of the devices is reduced.

Furthermore, the flaky alumina particles may include molybdenum, and a content and a state of existence of the molybdenum may be controlled in a production method, which will be described later. With such control, the physical properties and performance of the flaky alumina, such as optical properties including, for example, a hue, transparency, and the like, can be adjusted as desired in accordance with the intended use.

As used in the present invention, the term “flaky” refers to having an aspect ratio of 2 or greater. The aspect ratio is a ratio obtained by dividing an average particle diameter of the alumina particles by a thickness of the alumina particles. Note that in this specification, the “thickness of the alumina particles” is the arithmetic mean of measured thicknesses of at least 50 flaky alumina particles, which are randomly selected from an image obtained with a scanning electron microscope (SEM). Furthermore, the “average particle diameter of the alumina particles” is a value calculated as a volume-based median diameter d50 from a volume-based cumulative particle size distribution, which is measured by a laser diffraction/scattering particle size distribution analyzer.

In the alumina particles of the present invention, the attributes, namely, the thickness, the average particle diameter, and the aspect ratio, may be in any of various combinations provided that the alumina particles have a flaky shape.

In the flaky alumina particles of the embodiment, it is preferable that the thickness be 0.01 to 5 μm, the average particle diameter be 0.1 to 500 μm, and the aspect ratio, which is the ratio of the particle diameter to the thickness, be 2 to 500. When the aspect ratio of the flaky alumina particles is greater than or equal to 2, two-dimensional mixing characteristics can be obtained, and, therefore, such an aspect ratio is preferable. When the aspect ratio of the flaky alumina particles is less than or equal to 500, excellent mechanical strength is achieved, and, therefore, such an aspect ratio is preferable. More preferably, the thickness is 0.03 to 3 μm, the average particle diameter is 0.5 to 100 μm, and the aspect ratio, which is the ratio of the particle diameter to the thickness, is 10 to 300. When the aspect ratio is 10 to 300, a pigment formed of the flaky alumina particles has a high brightness, and, therefore, such an aspect ratio is preferable. Even more preferably, the thickness is 0.1 to 1 μm, the average particle diameter is 1 to 50 μm, and the aspect ratio, which is the ratio of the particle diameter to the thickness, is 11 to 100.

The flaky alumina particles of the embodiment may have a circular flake shape or an elliptical flake shape, but, in terms of handleability and ease of production, it is preferable that a shape of the particles be, for example, a polygonal flake shape, such as a hexagonal, heptagonal, or octagonal flake shape.

The thickness, the average particle diameter, the aspect ratio, and the like of the flaky alumina particles of the embodiment can be controlled by selecting usage ratios of a molybdenum compound, an aluminum compound, and a shape control agent, a type of the shape control agent, and/or a state of existence of the shape control agent and the aluminum compound.

The flaky alumina particles of the embodiment may be obtained by using any production method provided that mullite is included in a surface layer thereof. From the standpoint of achieving a higher aspect ratio, higher dispersibility, and higher productivity, it is preferable that the flaky alumina particles be obtained by firing an aluminum compound in the presence of a molybdenum compound and a shape control agent. It is desirable that the shape control agent be silicon or a silicon compound that contains elemental silicon because in this case, the shape control agent can be a source of Si of the mullite.

In the production method, the molybdenum compound is used as a fluxing agent. In this specification, hereinafter, the production method that uses a molybdenum compound as a fluxing agent may be referred to simply as a “flux method”. The flux method will be described in detail later. Note that in the firing, the molybdenum compound and the aluminum compound react with each other at a high temperature to form aluminum molybdate, and thereafter, presumably, when the aluminum molybdate decomposes into alumina and molybdenum oxide at a higher temperature, the molybdenum compound is incorporated into the flaky alumina particles. Molybdenum oxide that undergoes sublimation can be recovered and recycled. Presumably, in this process, silicon or a compound that contains silicon atoms, which is included as a shape control agent, reacts with the aluminum compound via the molybdenum, and as a result, mullite is formed in a surface layer of the flaky alumina particles. More specifically, the mechanism by which the mullite is formed is presumably as follows: in a flake surface of the alumina, molybdenum and Si atoms react with each other to form Mo—O—Si, and molybdenum and Al atoms react with each other to form Mo—O—Al, and, in high-temperature firing, Mo is removed, and mullite, which has a Si—O—Al bond, is formed.

It is preferable that molybdenum oxide that is not incorporated into the flaky alumina particles be recovered by sublimation and recycled. In this case, an amount of molybdenum oxide that adheres to the surface of the flaky alumina can be reduced, and, therefore, in a case where the flaky alumina is dispersed in a dispersion medium, example of which include an organic binder such as a resin and an inorganic binder such as glass, unintentional incorporation of the molybdenum oxide into the binder can be prevented, and, consequently, the inherent properties of the flaky alumina can be maximally provided.

Note that in the present invention, regarding the production method to be described later, a material that has a property of being sublimable is referred to as a fluxing agent, and a material that is not sublimable is referred to as a shape control agent.

The use of molybdenum and a shape control agent in the production of the flaky alumina particles enables the alumina particles to have a euhedral shape with a high degree of a crystallization and, therefore, to have excellent dispersibility and mechanical strength and high thermal conductivity.

An amount of the mullite formed in the surface layer of the flaky alumina particles can be controlled by the usage ratios of the molybdenum compound and the shape control agent. In particular, the amount of the mullite can be controlled by the usage ratio of the silicon or the silicon compound that contains elemental silicon, which is used as a shape control agent. Preferred values of the amount of the mullite formed in the surface layer of the flaky alumina particles and preferred usage ratios of the raw materials will be described in detail later.

As a result of the presence of mullite in the surface layer, the flaky alumina particles of the embodiment have a pH of an isoelectric point shifted to the acidic side compared with typical alumina, as determined by measurement of a zeta potential. The isoelectric point is the point at which the potential is zero.

The pH of the isoelectric point of the flaky alumina particles is, for example, within a range of 2 to 6. The pH of the isoelectric point is preferably within a range of 2.5 to 5 and more preferably within a range of 3 to 4. When the flaky alumina particles have a pH of the isoelectric point within any of the above-mentioned ranges, the flaky alumina particles exhibit high electrostatic repulsion and, therefore, can exhibit enhanced dispersion stability on their own in an instance where the flaky alumina particles are added to a dispersion medium, such as those described above, and modification of the flaky alumina particles by surface treatment that uses a coupling agent or the like is facilitated in a case where a further improvement in performance is to be achieved.

Presumably, since mullite has a lower density than alumina, as an amount of mullite present in the flaky alumina particles increases, a density of the flaky alumina particles decreases.

The flaky alumina particles of the embodiment have a density of 3.70 $g/cm^3$ or greater and 4.10 $g/cm^3$ or less, for example. The density is preferably 3.72 $g/cm^3$ or greater and 4.10 $g/cm^3$ or less, and more preferably, the density is 3.80 $g/cm^3$ or greater and 4.10 $g/cm^3$ or less.

When the value of the density of the flaky alumina particles is within any of the above-mentioned ranges, the amount of mullite present in the surface layer is appropriate, and, therefore, the flaky alumina particles have excellent quality and have a superior effect in reducing the wearing out of devices.

The density is to be conducted under the conditions that are the same as the measurement conditions listed in the Examples section, which will be described later, or under compatible conditions under which the same measurement results can be obtained.

[Alumina]

The alumina present in the flaky alumina particles of the embodiment is aluminum oxide and, for example, may be any of various types of transition alumina that have a crystalline form such as γ, δ, θ, or κ, and the transition alumina may include an alumina hydrate. However, basically, it is preferable that the alumina be alumina having an α-crystalline form (α type), in terms of higher mechanical strength or higher thermal conductivity. The α-crystalline form is a dense crystal structure of alumina and is, therefore, advantageous in improving the mechanical strength or thermal conductivity of the flaky alumina of the present invention.

It is preferable that the degree of α crystallization be as close as possible to 100% because in such a case, the inherent properties of the α-crystalline form can be easily exhibited. The degree of α crystallization of the flaky alumina particles of the embodiment is, for example, greater than or equal to 90%. The degree of α crystallization is preferably greater than or equal to 95% and more preferably greater than or equal to 99%.

[Mullite]

Because of the presence of mullite in the surface layer of the flaky alumina particles, a prominent reduction in the wearing out of devices is achieved with the present invention. The mullite, which is present in the surface layer of the flaky alumina particles of the embodiment, is a composite oxide of Al and Si and represented by $Al_xSi_yO_z$, where the values of x, y, and z are not particularly limited. A more preferred range is $Al_2Si_1O_5$ to $Al_6Si_2O_{13}$. Note that the XRD peaks identified in the Examples, which will be described later, are those of $Al_{2.85}Si_1O_{6.3}$, $Al_3Si_1O_{6.5}$, $Al_{3.67}Si_1O_{7.5}$, $Al_4Si_1O_8$, and $Al_6Si_2O_{13}$. The flaky alumina particles of the embodiment may include, in the surface layer, at least one compound selected from the group consisting of $Al_{2.85}Si_1O_{6.3}$, $Al_3Si_1O_{6.5}$, $Al_{3.67}Si_1O_{7.5}$, $Al_4Si_1O_8$, and $Al_6Si_2O_{13}$. As used herein, the term "surface layer" refers to a region within 10 nm of the surface of the flaky alumina particles of the embodiment. The distance corresponds to the probing depth of the XPS used for a measurement in the Examples. Note that the mullite surface layer is a very thin layer having a thickness of not greater than 10 nm; in a case where a defect or the like of the mullite crystal increases in the surface and an interface, the hardness of the mullite surface layer becomes lower than the Mohs hardness (7.5) of the original mullite, and such mullite can prominently reduce the wearing out of devices compared with mullite having few or no crystal defects.

In the flaky alumina particles of the embodiment, it is preferable that mullite be localized in the surface layer. As used herein, the expression "localized in the surface layer" refers to a state in which the mass of mullite per unit volume in the surface layer is greater than the mass of mullite per unit volume in the remaining portion, other than the surface layer. The determination that mullite is localized in the surface layer can be made by comparing the result of analysis of the surface, which is performed by XPS, and the result of analysis of the entirety, which is performed by XRF, as described in the Examples section later. When mullite is localized in the surface layer, the reduction in the wearing out property of devices associated with mullite can be achieved with a small amount of mullite compared with a case in which mullite is present not only in the surface layer but also in another region (an inner layer), other than the surface layer, assuming that the levels of reduction are comparable.

Since mullite is present in the surface layer of the flaky alumina particles of the embodiment, Si is detected therefrom when an XPS analysis is performed thereon. In the flaky alumina particles of the embodiment, the value of a molar ratio [Si]/[Al], which is the ratio of moles of Si to moles of Al obtained by XPS analysis, is preferably greater than or equal to 0.15, more preferably greater than or equal to 0.20, and even more preferably greater than or equal to 0.25. The results of XPS of the Examples, which will be described later, indicate that as an amount of loading of $SiO_2$, which is a raw material, increases, the value of [Si]/[Al] increases, but the value stops increasing at some point. Presumably, this indicates that the content of Si on the flaky alumina particles has reached a maximum level. Thus, presumably, when the value of the molar ratio [Si]/[Al] is greater than or equal to 0.20, or, in particular, greater than or equal to 0.25, the flaky alumina particles are in a state in which the surface is coated with mullite. The state in which the surface is coated may be a state in which the surface of the flaky alumina particles is entirely coated with mullite or may be a state in which the surface of the flaky alumina particles is at least partially coated with mullite.

The upper limit of the value of the molar ratio [Si]/[Al] determined by XPS analysis is not particularly limited and is preferably less than or equal to 0.4, more preferably less than or equal to 0.35, and even more preferably less than or equal to 0.3.

In the flaky alumina particles of the embodiment, the value of the molar ratio [Si]/[Al], which is the ratio of moles of Si to moles of Al obtained by XPS, is preferably 0.15 or greater and 0.4 or less, more preferably 0.20 or greater and 0.35 or less, and even more preferably 0.25 or greater and 0.3 or less.

When the value of the molar ratio [Si]/[Al] obtained by XPS of the flaky alumina particles is within any of the above-mentioned ranges, the amount of the mullite present in the surface layer is appropriate, and, therefore, the flaky alumina particles have excellent quality and have a superior effect in reducing the wearing out of devices.

The XPS analysis is to be conducted under the conditions that are the same as the measurement conditions listed in the Examples section, which will be described later, or under compatible conditions under which the same measurement results can be obtained.

In the present invention, in the method for producing flaky alumina to be described later, the silicon or the silicon compound that contains elemental silicon, such as $SiO_2$, that has been loaded is converted into mullite with high efficiency, and as a result, flaky alumina having excellent quality is obtained.

Since mullite is present in the flaky alumina particles of the embodiment, diffraction peaks of mullite are detected therefrom when an XRD analysis is performed thereon. The diffraction peaks of mullite can be clearly distinguished from diffraction peaks of the silicon or the silicon compound that contains elemental silicon, which may be, for example, $SiO_2$ or the like. In the flaky alumina particles of the embodiment, the ratio of a peak intensity of mullite observed at $2\theta=26.2\pm0.2°$ to a peak intensity of the (104) face of α-alumina observed at $2\theta=35.1\pm0.2°$, as obtained by XRD analysis, is, for example, greater than or equal to 0.02. The ratio is preferably greater than or equal to 0.05 and more preferably greater than or equal to 0.1.

The upper limit of the value of the ratio between the peak intensities is not particularly limited and is, for example, less than or equal to 0.3. The upper limit is preferably less than or equal to 0.2 and more preferably less than 0.12.

In the flaky alumina particles of the embodiment, the ratio of the peak intensity of mullite observed at $2\theta=26.2\pm0.2°$ to the peak intensity of the (104) face of α-alumina observed at $2\theta=35.1\pm0.2°$, as obtained by XRD analysis, is, for example, 0.02 or greater and 0.3 or less. The ratio is preferably 0.05 or greater and 0.2 or less and more preferably 0.1 or greater and less than 0.12.

When the value of the ratio between the peak intensities of the flaky alumina particles is within any of the above-mentioned ranges, the amount of the mullite is appropriate, and, therefore, the flaky alumina particles have excellent quality and have a superior effect in reducing the wearing out of devices.

The XRD analysis is to be conducted under the conditions that are the same as the measurement conditions listed in the Examples section, which will be described later, or under compatible conditions under which the same measurement results can be obtained.

Since mullite is present in the flaky alumina particles of the embodiment, Si is detected therefrom when an XRF analysis is performed thereon. In the flaky alumina particles of the embodiment, a molar ratio [Si]/[Al], which is the ratio of moles of Si to moles of Al obtained by XRF analysis, is, for example, less than or equal to 0.04. The molar ratio [Si]/[Al] is preferably less than or equal to 0.035 and more preferably less than or equal to 0.02.

Furthermore, the value of the molar ratio [Si]/[Al] is not particularly limited and is, for example, greater than or equal to 0.003. The value is preferably greater than or equal to 0.004 and more preferably greater than or equal to 0.008.

In the flaky alumina particles of the embodiment, the molar ratio [Si]/[Al], which is the ratio of moles of Si to moles of Al obtained by XRF analysis, is, for example, 0.003 or greater and 0.04 or less. The molar ratio [Si]/[Al] is preferably 0.004 or greater and 0.035 or less and more preferably 0.008 or greater and 0.02 or less.

When the value of the molar ratio [Si]/[Al] obtained by XRF analysis of the flaky alumina particles is within any of the above-mentioned ranges, the amount of the mullite is appropriate, and, therefore, the flaky alumina particles have excellent quality and have a superior effect in reducing the wearing out of devices.

The flaky alumina particles of the embodiment contain silicon corresponding to the mullite that is based on the silicon or the silicon compound that contains elemental silicon, which is used in the method for producing the flaky alumina particles. A content of the silicon, calculated as silicon dioxide, is preferably less than or equal to 10 mass % relative to a total mass of the flaky alumina particles of the embodiment taken as 100 mass %; more preferably, the content is 0.001 to 5 mass %, even more preferably 0.01 to 4 mass %, and particularly preferably 0.6 to 2.5 mass %. When the content of silicon is within any of the above-mentioned ranges, the amount of the mullite is appropriate. Accordingly, such a content of the silicon is preferable. The content of silicon can be determined by XRF analysis.

The XRF analysis is to be conducted under the conditions that are the same as the measurement conditions listed in the Examples section, which will be described later, or under compatible conditions under which the same measurement results can be obtained.

Furthermore, the mullite in the surface layer may be in the form of a mullite layer or in a state in which mullite and alumina coexist. Regarding the interface between the mullite and the alumina in the surface layer, the mullite and the alumina may be in physical contact with each other, or the mullite and the alumina may form a chemical bond such as Si—O—Al. In contrast to a combination of alumina and $SiO_2$, the combination of alumina and mullite, which are present as essential components, provides a strong bond between alumina and mullite that does not easily separate. This is because the constituent atomic compositions of alumina and mullite are highly similar, and in a case where a flux method is employed, a chemical bond such as Si—O—Al, mentioned above, can be easily formed in association with the method. Accordingly, the combination of alumina and mullite, which are present as essential components, ensures that the wearing out of devices does not easily occur over a longer period of time, provided that the Si content is at a comparable level, and, therefore, the combination is preferable. The technical effects of the combination of alumina and mullite, which are present as essential components, can be expected both in the case where alumina and mullite are exclusively present and in the case where alumina, mullite, and silica are present. However, rather, the technical effects are at a higher level in the case where the former combination of the two is used.

[Molybdenum]

Furthermore, the flaky alumina particles of the embodiment may contain molybdenum. The molybdenum is molybdenum derived from the molybdenum compound used as a fluxing agent.

Molybdenum has a catalytic function and an optical function. Furthermore, with the use of molybdenum, the formation of mullite is promoted in the production method as described later, and, therefore, flaky alumina particles having a high aspect ratio and excellent dispersibility can be produced. Furthermore, the characteristics of the molybdenum included in the flaky alumina particles can be utilized to use the flaky alumina particles in applications such as catalysts for oxidation reactions and optical materials.

Examples of the molybdenum include, but are not limited to, molybdenum metal, molybdenum oxide, and a partially reduced molybdenum compound. Presumably, the molybdenum is included as $MoO_3$ in the flaky alumina particles. In addition to $MoO_3$, the molybdenum may be included as $MoO_2$, MoO, and/or the like in the flaky alumina particles.

The form in which the molybdenum is present is not particularly limited, and any of the following forms is possible: a form in which the molybdenum adheres to the surface of the flaky alumina particles; a form in which molybdenum partially replaces aluminum in the crystal structure of the alumina; and a combination of these forms.

A content of the molybdenum, calculated as molybdenum trioxide, is preferably less than or equal to 10 mass % relative to the total mass of the flaky alumina particles of the embodiment taken as 100 mass %; the content is more preferably 0.001 to 5 mass %, even more preferably 0.01 to 5 mass % or less, and particularly preferably 0.1 to 1.2 mass %, which can be achieved by adjusting a firing temperature, a firing time, and/or a rate of sublimation of the molybdenum compound. When the content of the molybdenum is less than or equal to 10 mass %, the quality of the α single crystal of the alumina is improved. Accordingly, such a content is preferable.

The content of the molybdenum can be determined by XRF analysis. The XRF analysis is to be conducted under the conditions that are the same as the measurement conditions listed in the Examples section, which will be described later, or under compatible conditions under which the same measurement results can be obtained.

[Organic Compound]

In an embodiment, the flaky alumina particles may include an organic compound. The organic compound is present on a surface of the flaky alumina particles and has a function of adjusting the physical properties of the surface of the flaky alumina particles. For example, when the flaky alumina particles include an organic compound on the surface, the flaky alumina particles have an improved affinity for a resin and, therefore, maximally exhibit a function of the flaky alumina particles as a filler.

Examples of the organic compound include, but are not limited to, organosilanes, alkyl phosphonic acids, and polymers.

Examples of the organosilanes include alkyl trimethoxysilanes and alkyl trichlorosilanes in which the alkyl group has 1 to 22 carbon atoms, such as methyltrimethoxysilane, dimethyldimethoxysilane, ethyltrimethoxysilane, ethyltriethoxysilane, n-propyltrimethoxysilane, n-propyltriethoxysilane, isopropyltrimethoxysilane, isopropyltriethoxysilane, pentyltrimethoxysilane, and hexyltrimethoxysilane, trimethoxy(3,3,3-trifluoropropyl)silane, (tridecafluoro-1,1,2,2-tetrahydrooctyl)trichlorosilane, phenyltrimethoxysilane, phenyltriethoxysilane, p-(chloromethyl)phenyltrimethoxysilane, and p-(chloromethyl)phenyltriethoxysilane.

Examples of the phosphonic acids include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexyl methylphosphonic acid, cyclohexyl ethylphosphonic acid, benzylphosphonic acid, phenylphosphonic acid, and dodecyl benzene phosphonic acid.

Suitable examples of the polymers include poly(meth)acrylates. Specifically, examples of the polymers include polymethyl(meth)acrylate, polyethyl(meth)acrylate, polybutyl(meth)acrylate, polybenzyl(meth)acrylate, polycyclohexyl(meth)acrylate, poly(t-butyl(meth)acrylate), polyglycidyl(meth)acrylate, and polypentafluoropropyl(meth)acrylate, and further examples include general-purpose polymers, such as polystyrene, polyvinyl chloride, polyvinyl acetate, epoxy resins, polyesters, polyimides, and polycarbonates.

Note that the organic compounds mentioned above may be present alone or in a combination of two or more.

The form in which the organic compound is present is not particularly limited. The organic compound may be covalently bonded to the alumina and/or may coat the alumina.

A content of the organic compound is preferably less than or equal to 20 mass % and more preferably 10 to 0.01 mass %, relative to a mass of the flaky alumina particles. When the content of the organic compound is less than or equal to 20 mass %, the physical properties derived from the flaky alumina particles can be easily exhibited, and, therefore, such a content is preferable.

<Method for Producing Flaky Alumina Particles>

Methods for producing the flaky alumina particles are not particularly limited, and a known technique may be used appropriately. Preferably, a production method based on a flux method that utilizes a molybdenum compound may be used because, with such a method, alumina having a high degree of α crystallization can be suitably controlled at a relatively low temperature.

More specifically, a preferred method for producing the flaky alumina particles includes a step (firing step) of firing an aluminum compound in the presence of a molybdenum compound and a shape control agent. The firing step may be a step of firing a mixture resulting from a step (mixing step) of obtaining the mixture to be fired.

[Mixing Step]

The mixing step is a step of mixing an aluminum compound, a molybdenum compound, and a shape control agent together to form a mixture. Details of the mixture will be described below.

(Aluminum Compound)

In the present invention, the aluminum compound is a compound that contains elemental aluminum and is a raw material for the flaky alumina particles of the embodiment. The aluminum compound is not particularly limited provided that the aluminum compound is converted to alumina when subjected to heat treatment. Examples of the aluminum compound include aluminum chloride, aluminum sulfate, basic aluminum acetate, aluminum hydroxide, boehmite, pseudoboehmite, transition alumina (e.g., γ-alumina, δ-alumina, and θ-alumina), α-alumina, and mixed aluminas having two or more crystal phases. The physical forms of any of these aluminum compounds used as a precursor, such as a shape, a particle diameter, and a specific surface area, are not particularly limited.

In a flux method to be described in detail later, the shape of the flaky alumina particles of the embodiment may be any suitable shape, examples of which include spherical shapes, amorphous shapes, shapes of structures having an aspect (e.g., wires, fibers, ribbons, and tubes), and sheet shapes.

Similarly, in the flux method to be described in detail later, the aluminum compound may be a suitable solid aluminum compound, and the particle diameter thereof may range from several nanometers to several hundred micrometers.

Also, the specific surface area of the aluminum compound is not particularly limited. It is preferable that the specific surface area be high because in such a case, the molybdenum compound acts effectively. However, by adjusting firing conditions and/or an amount of usage of the molybdenum compound, an aluminum compound having any specific surface area can be used as a raw material.

Furthermore, the aluminum compound may be a compound exclusively including an aluminum compound or may be a composite material including an aluminum compound and an organic compound. Suitable examples that may be used include organic-inorganic composite materials obtained by modifying an aluminum compound with an organosilane and composite materials of an aluminum compound including a polymer adsorbed thereon. In a case where a composite material such as those described above is used, a content of the organic compound is not particularly limited. From the standpoint of efficiently producing the flaky alumina particles, the content is preferably less than or equal to 60 mass % and more preferably less than or equal to 30 mass %.

(Shape Control Agent)

A shape control agent may be used to form the flaky alumina particles of the embodiment. The shape control agent plays an important role in the growth of flaky crystals of alumina in the firing of the aluminum compound in the presence of the molybdenum compound.

A state of existence of the shape control agent is not particularly limited. Examples of suitable materials include a material in which the shape control agent is physically mixed with the aluminum compound; and a composite material in which the shape control agent is uniformly or locally present on a surface of the aluminum compound or in an inner portion thereof.

Furthermore, the shape control agent may be added to the aluminum compound and/or may be present as an impurity in the aluminum compound.

The shape control agent plays an important role in the growth of flaky crystals. In a typical molybdenum oxide flux method, molybdenum oxide is selectively adsorbed onto the (113) face of the a crystal of the alumina, which makes it difficult for the crystal components to be supplied to the (113) face, thereby completely suppressing the emergence of the (001) face or the (006) face, and as a result, polyhedral particles based on a hexagonal bipyramidal shape are formed. In the production method according to an embodiment, with the use of a shape control agent, the molybdenum oxide that is a flux agent suppresses the selective adsorption of the crystal components onto the (113) face, and as a result, a flaky morphology in which the (001) face is developed and which has a hexagonal close-packed crystal structure, which is thermodynamically most stable, can be formed. The use of a molybdenum compound as a flux agent facilitates the formation of flaky alumina particles containing molybdenum and having a high degree of a crystallization.

Regarding the type of the shape control agent, it is preferable to use silicon or a silicon compound that contains elemental silicon because silicon or a silicon compound that contains elemental silicon can be a source of Si of the mullite and, therefore, enables efficient production of the mullite. Furthermore, the use of silicon or a silicon compound that contains elemental silicon is preferable in terms of enabling production of flaky alumina particles having a higher aspect ratio, a higher dispersibility, and higher productivity.

The flux method described above, which uses silicon or a silicon compound as a shape control agent, facilitates the production of the flaky alumina particles including mullite in a surface layer thereof.

The silicon or the silicon compound that contains elemental silicon is not particularly limited and may be one known in the art. Specific examples of the silicon or the silicon compound that contains elemental silicon include silicon metals; artificial/synthetic silicon compounds, such as organosilanes, silicone resins, silica microparticles, silica gels, mesoporous silicas, SiC, and mullite; and natural silicon compounds, such as biogenic silicas. Among these, the use of an organosilane, a silicone resin, or silica microparticles is preferable because these materials can be more uniformly combined and mixed with the aluminum compound. Note that the silicons or the silicon compounds that contain elemental silicon may be used alone or in a combination of two or more.

A shape of the silicon or the silicon compound that contains elemental silicon is not particularly limited, and suitable examples of the shape include spherical shapes, amorphous shapes, shapes of structures having an aspect (e.g., wires, fibers, ribbons, and tubes), and sheet shapes.

(Potassium Compound)

A potassium compound may be additionally used as a shape control agent, in combination with the silicon or the silicon compound that contains elemental silicon.

Examples of the potassium compound include, but are not limited to, potassium chloride, potassium chlorite, potassium chlorate, potassium sulfate, potassium hydrogen sulfate, potassium sulfite, potassium bisulfate, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, and potassium tungstate. In this case, the potassium compounds include isomers as with the molybdenum compounds. Among these, potassium carbonate, potassium hydrogen carbonate, potassium oxide, potassium hydroxide, potassium chloride, potassium sulfate, and potassium molybdate are preferable. Potassium carbonate, potassium hydrogen carbonate, potassium chloride, potassium sulfate, and potassium molybdate are more preferable. The potassium compounds mentioned above may be used alone or in a combination of two or more. Furthermore, potassium molybdate contains molybdenum and, therefore, can also have functions of the molybdenum compound described above.

The potassium compound significantly contributes to efficient formation of mullite in the surface layer of the alumina.

(Molybdenum Compound)

The molybdenum compound contains elemental molybdenum and functions as flux for the growth of the α crystal of the alumina at a relatively low temperature, as will be described later.

Examples of the molybdenum compound include, but are not limited to, molybdenum oxide and compounds containing acid group anions ($MoO_x^{n-}$) in which molybdenum metal is bonded to oxygen.

Examples of the compound containing acid group anions ($MoO_x^{n-}$) include, but are not limited to, molybdic acid, sodium molybdate, potassium molybdate, lithium molybdate, $H_3PMo_{12}O_{40}$, $H_3SiMo_{12}O_{40}$, $NH_4Mo_7O_{12}$, and molybdenum disulfide.

The molybdenum compound may contain silicon, and in this case, the molybdenum compound containing silicon serves both as a flux agent and as a shape control agent.

Of the molybdenum compounds mentioned above, molybdenum oxide is preferable from the standpoint of cost and ease of sublimation. The molybdenum compounds mentioned above may be used alone or in a combination of two or more.

Amounts of usage of the aluminum compound, the molybdenum compound, and the silicon or the silicon compound are not particularly limited. Preferably, the aluminum compound is in an amount greater than or equal to 50 mass %, calculated as $Al_2O_3$, the molybdenum compound is in an amount less than or equal to 40 mass %, calculated as $MoO_3$, and the silicon or the silicon compound is in an amount of 0.5 mass % or greater and less than 10 mass %, calculated as $SiO_2$, relative to the total mass of the flaky alumina particles taken as 100 mass %; these may be mixed together to form a mixture, and the mixture may be fired. More preferably, the aluminum compound is in an amount of 70 mass % or greater and 99 mass % or less, calculated as $Al_2O_3$, the molybdenum compound is in an amount of 0.5 mass % or greater and 20 mass % or less, calculated as $MoO_3$, and the silicon or the silicon compound is in an amount of 0.5 mass % or greater and 10 mass % or less, calculated as $SiO_2$, relative to the total mass of the flaky alumina particles taken as 100 mass %; these may be mixed together to form a mixture, and the mixture may be fired. Even more preferably, the aluminum compound is in an amount of 80 mass % or greater and 94.5 mass % or less, calculated as $Al_2O_3$, the molybdenum compound is in an amount of 1 mass % or greater and 7 mass % or less, calculated as $MoO_3$, and the silicon or the silicon compound is in an amount of 1 mass % or greater and 7 mass % or less, calculated as $SiO_2$, relative to the total mass of the flaky alumina particles taken as 100 mass %; these may be mixed together to form a mixture, and the mixture may be fired.

Using the compounds within any of the above-mentioned ranges ensures that the resulting flaky alumina particles have a more appropriate amount of mullite in the surface layer. Consequently, the flaky alumina particles can be produced in which the shape of the particles is a polygonal flake shape and which have a thickness of 0.01 to 5 μm, an average particle diameter of 0.1 to 500 μm, and an aspect ratio, which is the ratio of the particle diameter to the thickness, of 2 to 500.

In a case where the mixture further includes the potassium compound, an amount of usage of the potassium compound is not particularly limited. Preferably, the potassium compound in the mixture is in an amount of 5 mass % or less, calculated as $K_2O$, relative to the total mass of the flaky alumina particles taken as 100 mass %. More preferably, the potassium compound in the mixture is in an amount of 0.01 mass % or greater and 3 mass % or less, calculated as $K_2O$, relative to the total mass of the flaky alumina particles taken as 100 mass %. Even more preferably, the potassium compound in the mixture is in an amount of 0.05 mass % or greater and 1 mass % or less, calculated as $K_2O$, relative to the total mass of the flaky alumina particles taken as 100 mass %.

Presumably, potassium molybdate that is formed by a reaction between the used potassium compound and the molybdenum compound produces an effect of dispersing Si and, therefore, contributes to promoting the formation of mullite in a surface of the flaky alumina particles.

The potassium compound used as a raw material to be loaded or the potassium compound formed in a reaction in the heating process of firing may be a water-soluble potassium compound, which may be, for example, potassium molybdate. In this case, since potassium molybdate does not vaporize even in a firing temperature range and can be easily recovered by washing after firing, the amount of the molybdenum compound that is released to the outside of the firing furnace is reduced, and the production cost is significantly reduced.

The aluminum compound, the molybdenum compound, the silicon or the silicon compound, and the potassium compound are used in a manner such that the total of the amounts of usage, calculated as an oxide, does not exceed 100 mass %.

[Firing Step]

The firing step is a step of firing the aluminum compound in the presence of the molybdenum compound and the shape control agent. The firing step may be a step of firing the mixture resulting from the mixing step.

The flaky alumina particles of the embodiment can be obtained, for example, by firing the aluminum compound in the presence of the molybdenum compound and the shape control agent. This production method is called a flux method as stated above.

The flux method is classified as a solution method. More specifically, the flux method is a crystal growth method utilizing an instance in which a crystal-flux binary phase diagram is of a eutectic type. It is speculated that the mechanism of the flux method is as follows. Specifically, as a mixture of a solute and flux is heated, the solute and the flux form a liquid phase. In this case, since the flux is a fusing agent, that is, the solute-flux binary phase diagram is of a eutectic type, the solute melts at a temperature lower than its melting point to form the liquid phase. When the flux is evaporated in this state, the concentration of the flux decreases, that is, the effect of the flux of decreasing the melting point of the solute is reduced, and thus, the evaporation of the flux serves as a driving force to cause crystals of the solute to grow (flux evaporation method). Note that the crystals of the solute can also be grown by cooling the liquid phase of the solute and the flux (slow cooling method).

The flux method has advantages. For example, crystals can be grown at temperatures much lower than a melting point; crystal structures can be precisely controlled; and polyhedral crystals having a euhedral shape can be formed.

The mechanism by which α-alumina particles are produced by a flux method that uses a molybdenum compound as flux is not necessarily clear. However, for example, it is speculated that the mechanism is as follows. Specifically, when an aluminum compound is fired in the presence of a molybdenum compound, aluminum molybdate is first formed. In this case, crystals of α-alumina grow from the aluminum molybdate at temperatures lower than the melting point of alumina, as will be appreciated from the description above. Then, for example, when the flux is evaporated, the aluminum molybdate decomposes, and crystals grow, and consequently, α-alumina particles can be obtained. That is, the molybdenum compound serves as flux, and, via aluminum molybdate, which is an intermediate product, the α-alumina particles are produced.

The mechanism by which α-alumina particles are produced by a flux method in a case where a potassium compound is additionally used as a shape control agent is not necessarily clear. However, for example, it is speculated that the mechanism is as follows. First, the molybdenum compound and the aluminum compound react with each other to form aluminum molybdate. Then, for example, the aluminum molybdate decomposes into molybdenum oxide and alumina, and also, a molybdenum compound that contains the molybdenum oxide resulting from the decomposition reacts with the potassium compound to form potassium molybdate. The crystals of alumina grow in the presence of the molybdenum compound that contains the potassium molybdate, and, consequently, the flaky alumina particles of the embodiment can be obtained.

With the flux method described above, the flaky alumina particles can be produced in which mullite is present in a surface layer and a shape of the particles is a polygonal flake shape and which have a thickness of 0.01 to 5 μm, an average particle diameter of 0.1 to 500 μm, and an aspect ratio, which is the ratio of the particle diameter to the thickness, of 2 to 500.

Methods for the firing are not particularly limited, and the firing may be performed by using a known method. When the firing temperature exceeds 700° C., the aluminum compound reacts with the molybdenum compound to form aluminum molybdate. Furthermore, when the firing temperature reaches 900° C. or higher, the aluminum molybdate decomposes, and, under the action of the shape control agent, the flaky alumina particles are formed. Furthermore, presumably, when the aluminum molybdate decomposes into alumina and molybdenum oxide, a molybdenum compound is incorporated into particles of the aluminum oxide in the flaky alumina particles.

Furthermore, presumably, when the firing temperature reaches 900° C. or higher, the molybdenum compound (e.g., molybdenum trioxide) resulting from the decomposition of the aluminum molybdate reacts with the potassium compound to form potassium molybdate.

Furthermore, presumably, when the firing temperature reaches 1000° C. or higher, the crystals of the flaky alumina particles grow in the presence of molybdenum, and $Al_2O_3$ and $SiO_2$ in a surface of the flaky alumina particles react with each other to form mullite with high efficiency.

Furthermore, in the firing, the states of the aluminum compound, the shape control agent, and the molybdenum compound are not particularly limited, and it is sufficient that the aluminum compound, the shape control agent, and the molybdenum compound be present in the same space such that the molybdenum compound and the shape control agent can act on the aluminum compound. Specifically, any of the following may be employed: simple mixing in which powders of the molybdenum compound, the shape control agent, and the aluminum compound are mixed together, mechanical mixing using a mill or the like, and mixing using a mortar or the like; and either of dry mixing and wet mixing may be employed.

The conditions of the firing temperature are not particularly limited and are appropriately determined in consideration of the average particle diameter, the aspect ratio, the formation of mullite, the dispersibility, and the like of the target flaky alumina particles. Typically, with regard to the temperature for the firing, the maximum temperature is preferably higher than or equal to 900° C., which is a decomposition temperature of aluminum molybdate ($Al_2(MoO_4)_3$), and more preferably higher than or equal to 1000° C., at which mullite is formed with high efficiency.

In general, controlling the shape of α-alumina that results from firing requires the implementation of high-temperature firing at higher than or equal to 2000° C., which is close to the melting point of α-alumina. However, industrial application of such high-temperature firing involves significant problems in terms of the load on the firing furnace and the fuel cost.

The production method of the present invention can be implemented even at a high temperature of higher than 2000° C.; however, even at a temperature of 1600° C. or lower, which is much lower than the melting point of α-alumina, the production method can form flake-shaped α-alumina having a high degree of α crystallization and a high aspect ratio, regardless of the shape of the precursor.

According to an embodiment of the present invention, flaky alumina particles having a high aspect ratio and a degree of α crystallization of 90% or greater can be formed efficiently at low cost even under the condition of a maximum firing temperature of 900 to 1600° C. More preferably, the firing is performed at a maximum temperature of 950 to 1500° C., and most preferably, the firing is performed at a maximum temperature within a range of 1000 to 1400° C.

With regard to the firing time, it is preferable that the time period for increasing the temperature to a predetermined maximum temperature be within a range of 15 minutes to 10 hours, and the holding time at the maximum firing temperature be within a range of 5 minutes to 30 hours. In terms of efficiently forming the flaky alumina particles, it is more preferable that the firing holding time be approximately 10 minutes to 15 hours.

In a case where the conditions of the maximum temperature of 1000 to 1400° C. and the firing holding time of 10 minutes to 15 hours are selected, alumina particles having a polygonal flake shape with a dense α-crystalline form can be easily obtained while the formation of aggregates is inhibited.

Atmospheres for the firing are not particularly limited provided that the effects of the present invention can be produced. For example, oxygen-containing atmospheres, such as air and oxygen, and inert atmospheres, such as nitrogen, argon, and carbon dioxide, are preferable, and, when cost is taken into consideration, air atmospheres are more preferable.

Apparatuses for performing the firing are also not necessarily limited, and a so-called firing furnace may be used. It is preferable that the firing furnace be formed of a material that does not react with sublimed molybdenum oxide, and it is further preferable that a gas-tight firing furnace be used to efficiently utilize the molybdenum oxide.

[Molybdenum Removal Step]

The method for producing flaky alumina particles may further include a molybdenum removal step in which at least a portion of the molybdenum is removed as necessary after the firing step.

As described above, the firing involves the sublimation of molybdenum, and, accordingly, by controlling the firing time, the firing temperature, and/or the like, the content of molybdenum present in the surface layer of the flaky alumina particles can be controlled, and the content and the state of existence of molybdenum present in another region (an inner layer), other than the surface layer of the alumina particles, can also be controlled.

The molybdenum can adhere to a surface of the flaky alumina particles. The molybdenum can be removed by washing with water, an aqueous ammonia solution, an aqueous sodium hydroxide solution, or an acidic aqueous solution, instead of by sublimation as described above. Note that the molybdenum does not necessarily have to be removed from the flaky alumina particles; however, it is preferable to remove at least the molybdenum present on the surface because in this case, the inherent properties of alumina can be sufficiently exhibited, and inconvenience that may be caused if molybdenum is present on the surface does not occur in an instance where, for example, the flaky alumina particles are used by being dispersed in a dispersion medium that is based on any of a variety of binders.

In this case, the content of molybdenum can be controlled by appropriately changing a concentration and an amount of usage of the water, aqueous ammonia solution, aqueous sodium hydroxide solution, or acidic aqueous solution to be used, the area to be washed, the washing time and/or the like.

[Pulverizing Step]

In some cases, the fired product may include aggregates of flaky alumina particles, and, consequently, the particle diameter range suitable for the present invention may not be achieved. Accordingly, as necessary, the flaky alumina particles may be pulverized so that the particle diameter range suitable for the present invention can be achieved.

Methods for pulverizing the fired product are not particularly limited. Any known pulverizing method using a ball mill, jaw crusher, jet mill, disc mill, SpectroMill, grinder, mixer mill, or the like may be employed.

[Size Classification Step]

It is preferable that the flaky alumina particles be subjected to a size classification process. A purpose of the size classification is to adjust the average particle diameter to improve the flowability of the powder or to suppress a viscosity increase that may occur when the flaky alumina particles are added to a binder for forming a matrix. The term "size classification process" refers to an operation of sorting particles by particle size.

The size classification may be wet classification or dry classification, but, from the standpoint of productivity, dry classification is preferable. The dry classification may be classification using a sieve or may be, for example, air classification, in which classification is performed by using the difference between the centrifugal force and the fluid drag. From the standpoint of classification accuracy, air classification is preferable, and the air classification may be performed by using a classifier, such as an air sifter that utilizes a Coanda effect, a swirling airflow type classifier, a forced vortex centrifugal classifier, or a semi-free vortex centrifugal classifier.

The pulverizing step and the size classification step described above may be performed at stages where the steps are necessary, the stages including the stages before and after an organic compound layer formation step, which will be described later. By selecting whether or not to perform the pulverizing and/or the size classification and/or selecting conditions therefor, the average particle diameter of the resulting flaky alumina particles, for example, can be adjusted.

It is preferable that the flaky alumina particles of the present invention and the flaky alumina particles produced by the production method of the present invention have few aggregates or no aggregates. This is because in such a case, their inherent properties can be easily exhibited, and the handleability thereof is enhanced, and enhanced dispersibility is exhibited in a case where the flaky alumina particles are used by being dispersed in a dispersion medium. In the method for producing flaky alumina particles, in a case where flaky alumina particles having few aggregates or no aggregates can be produced without performing the pulverizing step and/or the size classification step described above, these steps need not be performed. In this case, the target flaky alumina that has excellent properties can be produced with high productivity, and, accordingly, such a case is preferable.

[Organic Compound Layer Formation Step]

In an embodiment, the method for producing flaky alumina particles may further include an organic compound layer formation step. Typically, the organic compound layer formation step is performed after the firing step or after the molybdenum removal step.

Methods for forming the organic compound layer are not particularly limited, and a known method may be appropriately employed. Examples of the methods include a method in which a liquid including an organic compound is brought into contact with the molybdenum-containing flaky alumina particles and dried.

Note that the organic compound that may be used in the formation of the organic compound layer may be any of the organic compounds mentioned above.

EXAMPLES

The present invention will now be described in more detail with reference to examples. It should be noted that the present invention is not limited to the examples described below.

Production of Flaky Alumina Particles

Example 1

A mixture was obtained by mixing together 145.3 g of aluminum hydroxide (an average particle diameter of 10 μm, manufactured by Nippon Light Metal Company, Ltd.), 0.95 g of silicon dioxide (special grade, manufactured by Kanto Chemical Co., Inc.), and 5.0 g of molybdenum trioxide (manufactured by Taiyo Koko Co., Ltd.) in a mortar. The resulting mixture was placed in a crucible, which was heated to 1100° C. under the condition of 5° C./min in a ceramic electric furnace and then held at 1100° C. for 10 hours. In this manner, firing was performed. Subsequently, the crucible was cooled to room temperature under the condition of 5° C./min and was then removed. Thus, 98.0 g of a light blue powder was obtained. The resulting powder was ground in a mortar until the particles could be passed through a 106-μm sieve.

Subsequently, 98.0 g of the obtained light blue powder was dispersed in 150 mL of 0.5% ammonia water, and the dispersion was stirred at room temperature (25 to 30° C.) for 0.5 hours. Thereafter, filtration was performed to remove the ammonia water, which was followed by water washing and drying to remove molybdenum remaining on a surface of the particles. Thus, 95.0 g of a light blue powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.56%, calculated as molybdenum trioxide.

Example 2

An operation similar to that of Example 1 was performed with the only difference being that 145.3 g of aluminum hydroxide, 0.95 g of silicon dioxide, 5.0 g of molybdenum trioxide (manufactured by Taiyo Koko Co., Ltd.), and 0.25 g of potassium carbonate (special grade, manufactured by Kanto Chemical Co., Inc.) were mixed together in a mortar. Thus, 95.0 g of a light blue powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.48%, calculated as molybdenum trioxide.

Example 3

An operation similar to that of Example 1 was performed with the only difference being that 111.8 g of boehmite (an average particle diameter of 2 μm, manufactured by Taimei Chemicals Co., Ltd.), 1.9 g of silicon dioxide, and 5 g of molybdenum trioxide were mixed together in a mortar. Thus, 96.0 g of a white powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.90%, calculated as molybdenum trioxide.

Example 4

An operation similar to that of Example 1 was performed with the only difference being that 145.3 g of aluminum hydroxide, 1.9 g of silicon dioxide, 5.0 g of molybdenum trioxide, and 0.25 g of potassium carbonate were mixed together in a mortar. Thus, 96.0 g of a light blue powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.88%, calculated as molybdenum trioxide.

Example 5

An operation similar to that of Example 1 was performed with the only difference being that 145.3 g of aluminum hydroxide, 1.9 g of silicon dioxide, 5.0 g of molybdenum trioxide, and 0.5 g of potassium carbonate were mixed together in a mortar. Thus, 96.0 g of a white powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.43%, calculated as molybdenum trioxide.

Example 6

An operation similar to that of Example 1 was performed with the only difference being that 145.3 g of aluminum hydroxide, 4.8 g of silicon dioxide, and 5.0 g of molybdenum trioxide were mixed together in a mortar. Thus, 99.0 g of a white powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, furthermore, from the results of a quantitative analysis of X-ray fluorescence, it was confirmed that the obtained particles contained molybdenum in an amount of 0.88%, calculated as molybdenum trioxide.

Example 7

An operation similar to that of Example 1 was performed with the only difference being that 145.3 g of aluminum hydroxide, 4.8 g of silicon dioxide, 5.0 g of molybdenum trioxide, and 0.25 g of potassium carbonate were mixed together in a mortar. Thus, 99.0 g of a white powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.60%, calculated as molybdenum trioxide.

Example 8

An operation similar to that of Example 1 was performed with the only difference being that 145.3 g of aluminum hydroxide, 11.7 g of silicon dioxide, 5 g of molybdenum trioxide, and 0.25 g of potassium carbonate were mixed together in a mortar. Thus, 106.0 g of a white powder was obtained. SEM examination confirmed that the obtained powder had flake-shaped particles that had a polygonal flake shape and had very few aggregates and, therefore, had excellent handleability. In addition, when an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 0.40%, calculated as molybdenum trioxide.

The flaky alumina particles of Examples 2, 4, 5, 7, and 8, described above, which were produced by additionally using a potassium compound, were ones in which molybdenum that could have been present on the surface had been washed out with ammonia water, and potassium molybdate, which could have been formed by firing and present only in an inner portion of the particles, had been washed out with water since potassium molybdate itself is water-soluble.

Comparative Example 1

A mixture was obtained by mixing together 77.0 g of aluminum hydroxide (an average particle diameter of 10 μm, manufactured by Nippon Light Metal Company, Ltd.), 0.1 g of silicon dioxide (special grade, manufactured by Kanto Chemical Co., Inc.), and 50.0 g of molybdenum trioxide (manufactured by Taiyo Koko Co., Ltd.) in a mortar. The resulting mixture was placed in a crucible and fired at 1100° C. for 10 hours in a ceramic electric furnace. After cooling, the crucible was removed, and thus, 52 g of a light blue powder was obtained. The resulting powder was ground in a mortar until the particles could be passed through a 106-μm sieve.

Subsequently, 52.0 g of the obtained light blue powder was dispersed in 150 mL of 0.5% ammonia water, and the dispersion was stirred at room temperature (25 to 30° C.) for 0.5 hours. Thereafter, filtration was performed to remove the ammonia water, which was followed by water washing and drying to remove molybdenum remaining on a surface of the particles. Thus, 51.2 g of a blue powder was obtained.

When an XRD measurement was performed, a sharp scattering peak of α-alumina appeared, whereas peaks of alumina crystal systems other than the α-crystal structure were not observed. Accordingly, it was confirmed that flaky alumina having a dense crystal structure was obtained. In addition, from the results of a quantitative analysis of X-ray fluorescence, it was confirmed that the obtained particles contained molybdenum in an amount of 1.39%, calculated as molybdenum trioxide.

Comparative Example 1 is an example corresponding to Example 1 of Japanese Unexamined Patent Application Publication No. 2016-222501, which is listed above as PTL 5.

Comparative Example 2

Commercially available flaky alumina (Seraph, manufactured by Kinsei Matec Co., Ltd.) was used for evaluation.

<<Evaluations>>

The following evaluations were performed on the powders produced in Examples 1 to 8 and Comparative Examples 1 and 2, described above, which were used as samples. The methods for the measurements are described below.

[Measurement of Major Dimension L of Flaky Alumina]

The average particle diameter d50 (μm) was determined by using a laser diffraction particle size distribution analyzer HELOS (H3355) & RODOS (manufactured by Japan Laser Corporation) (R3: 0.5/0.9 to 175 μm), under conditions including a dispersion pressure of 3 bar and a suction pressure of 90 mbar. The determined average particle diameter d50 (μm) was designated as a major dimension L.

[Measurement of Thickness D of Flaky Alumina]

Thicknesses of 50 particles were measured by using a scanning electron microscope (SEM), and the average of the measurements was employed and designated as a thickness D (μm).

[Aspect Ratio L/D]

The aspect ratio was determined using the following equation.

$$\text{Aspect ratio}=\text{major dimension } L \text{ of flaky alumina}/\text{thickness } D \text{ of flaky alumina}$$

[Analysis of XRD Peak Intensity Ratio and Presence or Absence of Mullite]

The prepared sample was placed and loaded into a measurement sample holder having a depth of 0.5 mm in a manner such that the sample was flattened under a given load. The sample holder was placed in a wide-angle X-ray diffractometer (XRD) (Rint-Ultma, manufactured by Rigaku Corporation), and a measurement was conducted under conditions including the following: Cu-Kα ray; 40 kV-30 mA; a scan speed of 2°/min; and a scan range of 10 to 70°.

The presence or absence of mullite was determined using the following equation, where A is a peak height for mullite, observed at 2θ=26.2±0.2°, B is a peak height for the (104) face of α-alumina, observed at 2θ=35.1±0.2°, and C is a baseline value at 2θ=30±0.2°.

When the value was greater than or equal to 0.02, it was determined that mullite was "present", and when the value was less than 0.02, it was determined that mullite was "absent".

$$\text{Ratio of peak height for mullite to peak height for (104) face of }\alpha\text{-alumina}=(A-C)/(B-C) \quad \text{[Math. 1]}$$

[Analysis of Si Content of Surface Layer of Flaky Alumina Particles]

The prepared sample was pressed and secured to double-sided tape and was subjected to composition analysis, which was performed under conditions including the following, by using an X-ray photoelectron spectroscopy (XPS) instrument Quantera SNM (Ulvac-PHI, Inc.).

X-ray source: monochromatic AlKα; a beam diameter of 100 μm φ; and an output of 25 W Measurement: an analysis area of 1000 μm square; and n=3

Charge correction: C1s=284.8 eV

A Si content of the surface layer of the flaky alumina particles was determined as [Si]/[Al] determined by the results of the XPS analysis.

[Analysis of Si Content of Inside of Flaky Alumina Particles]

Approximately 70 mg of the prepared sample was placed on filter paper and covered with a PP film and then subjected to composition analysis, which was performed by using an X-ray fluorescence (XRF) spectrometer PrimusIV (manufactured by Rigaku Corporation).

A Si content of an inside of the flaky alumina particles was determined as [Si]/[Al] determined by the results of the XRF analysis.

[Analysis of Presence or Absence of $SiO_2$ particles]

In an image obtained with a scanning electron microscope (SEM), an examination was made regarding whether any circular-particle-like adhering object that was believed to be a $SiO_2$ particle was observed around a flaky alumina particle.

[Analysis of Mo Content of Inside of Flaky Alumina]

Approximately 70 mg of the prepared sample was placed on filter paper and covered with a PP film and then subjected to composition analysis, which was performed by using an X-ray fluorescence spectrometer PrimusIV (manufactured by Rigaku Corporation).

A molybdenum content was determined from the results of the XRF analysis. The molybdenum content was a content calculated as molybdenum trioxide (mass %), relative to the total mass of the flaky alumina particles taken as 100 mass %.

[Measurement of Density]

The prepared sample was pre-treated under the conditions of 300° C. and 3 hours. Subsequently, a measurement was performed by using a dry automatic densimeter AccuPyc II 1330, manufactured by Micromeritics, under conditions including a measurement temperature of 25° C. and the use of helium as a carrier gas.

[Measurement of Isoelectric Point]

A zeta potential was measured by using a zeta potential analyzer (Zetasizer Nano ZSP, from Malvern). 20 mg of the sample and 10 mL of a 10 mM aqueous KCl solution were stirred in an Awatori Rentaro (ARE-310, from Thinky Corporation) for 3 minutes in a stirring/defoaming mode and was allowed to stand for 5 minutes. The resulting supernatant was used as a measurement sample. By adding 0.1 N HCl to the sample by using an automatic titrator, a zeta potential was measured in a range up to a pH of 2 (an applied voltage of 100 V, a Monomodl mode). Accordingly, the pH of the isoelectric point, at which the potential was zero, was evaluated.

[Evaluation of Amount of Wear]

The prepared sample was melt-mixed with a PPS resin (LR-100G, manufactured by DIC Corporation) under conditions including 300° C. and 10 minutes in a manner such that the filler accounted for 40 vol %. Accordingly, a molded product of 70 mm×110 mm×2 mm (thickness) was obtained. A piece having a size of 10 mm×10 mm×2 mm was cut from the molded product and used as a test piece. A cutter, made of an alloy tool steel (SKS2), that had an exposed portion corresponding to a depth of 80 μm in a perpendicular direction with respect to the blade surface was pressed against the test piece with application of a load of 1 kg, in a manner such that the blade was perpendicularly in contact with the 10 mm×10 mm surface of the test piece. The blade was reciprocated 1000 times under conditions including a travel distance for one reciprocating motion of 100 mm and a speed of 75 mm/s. Subsequently, the depth of the blade was measured, and a ratio of the depth to the initial depth (80 μm) was determined. The ratio was designated as a retention ratio (%). Lower values of the retention ratio indicate greater amounts of wear.

[Analysis of Degree of α Crystallization]

The prepared sample was placed and loaded into a measurement sample holder having a depth of 0.5 mm in a manner such that the sample was flattened under a given load. The sample holder was placed in a wide-angle X-ray diffractometer (Rint-Ultma, manufactured by Rigaku Corporation), and a measurement was conducted under conditions including the following: Cu-Kα ray; 40 kV-30 mA; a scan speed of 2°/min; and a scan range of 10 to 70°. A degree of a crystallization was determined from the maximum peak height ratio between α-alumina and transition alumina.

Table 1 shows the amounts of the raw material compounds, calculated as oxides, (where the total amount is 100 mass %) and the results of the evaluations described above.

TABLE 1

| | Calculated as oxides | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|---|
| Amounts | $Al_2O_3$ | 94.1 | 94.0 | 93.2 | 93.1 | 93.0 | 90.6 | 90.5 | 84.9 | 50.1 | — |
| | $MoO_3$ | 5.0 | 4.9 | 4.9 | 4.9 | 4.9 | 4.8 | 4.8 | 4.5 | 49.8 | — |
| | $SiO_2$ | 0.9 | 0.9 | 1.9 | 1.9 | 1.9 | 4.6 | 4.6 | 10.5 | 0.1 | — |
| | $K_2O$ | 0.0 | 0.1 | 0.0 | 0.1 | 0.3 | 0.0 | 0.1 | 0.1 | 0.0 | — |
| L [μm] | | 6.1 | 6.2 | 10.3 | 12.5 | 12.9 | 10.5 | 11.2 | 10.9 | 10.1 | 7.7 |
| D [μm] | | 0.5 | 0.5 | 0.45 | 0.45 | 0.45 | 0.4 | 0.4 | 0.4 | 0.5 | 0.5 |
| Aspect ratio L/D | | 12 | 12 | 23 | 28 | 29 | 26 | 28 | 27 | 20 | 15 |
| Presence or absence of mullite | | Present | Present | Present | Present | Present | Present | Present | Present | Absent | Absent |
| XRD peak intensity ratio | | 0.02 | 0.03 | 0.09 | 0.11 | 0.11 | 0.11 | 0.12 | 0.12 | 0.01 | 0.01 |
| XPS molar ratio [Si]/[Al] | | 0.238 | 0.243 | 0.283 | 0.280 | 0.285 | 0.282 | 0.285 | 0.316 | 0.11 | N.D. |
| XRF molar ratio [Si]/[Al] | | 0.007 | 0.007 | 0.01 | 0.01 | 0.01 | 0.03 | 0.03 | 0.048 | 0.002 | 0.001 |
| Presence or absence of $SiO_2$ particle | | Absent | Absent | Absent | Absent | Absent | Absent | Absent | Present | Absent | Absent |
| XRF $SiO_2$ (mass %) | | 0.76 | 0.82 | 1.13 | 1.21 | 1.23 | 3.55 | 3.86 | 5.13 | 0.21 | 0.11 |
| XRF $MoO_3$ (mass %) | | 0.56 | 0.48 | 0.90 | 0.88 | 0.43 | 0.88 | 0.60 | 0.40 | 1.39 | N.D. |
| Density | | 3.95 | 3.96 | 3.94 | 3.94 | 3.95 | 3.75 | 3.76 | 3.61 | 3.99 | 3.94 |
| pH of isoelectric point | | 3.4 | 3.3 | 3.2 | 3.2 | 3.3 | 2.7 | 2.7 | 2.3 | 5.3 | 4.4 |
| Wear (retention ratio (%)) | | 38 | 42 | 52 | 55 | 56 | 55 | 57 | 60 | 28 | 25 |

It was confirmed that the powders obtained in Examples 1 to 8 and Comparative Examples 1 and 2 had the thickness, the average particle diameter, and the aspect ratio shown in Table 1.

Furthermore, from the measurement of the degree of α crystallization, it was confirmed that the powders obtained in Examples 1 to 8 and Comparative Examples 1 and 2 had a degree of α crystallization of 90% or greater.

In the powders obtained in Examples 1 to 8, the value of the XRD peak intensity ratio was greater than or equal to 0.02, and, therefore, the presence of mullite was observed.

Furthermore, the XPS analysis, in which the spectral peaks for the 2p region of the Si compounds were compared, confirmed that regarding the powders obtained in Examples 1 to 8, a high peak corresponding a [Si]/[Al] value of 0.15 or greater was observed in a binding energy range of 102.5±0.5 eV, which is representative of detection of the Si—O—Al mullite structure.

Furthermore, regarding the powder obtained in Comparative Example 2, no peak was observed in the binding energy range of 102.5±0.5 eV.

When Examples 1 to 8 are compared with Comparative Examples 1 and 2, it is clear that the flaky alumina particles of Examples 1 to 8, which included mullite in the surface layer, had a lower amount of wear associated with the wearing out of a blade than the alumina particles of Comparative Examples 1 and 2, which did not include mullite in the surface layer.

When attention is paid to the values of the XRD peak intensity ratio, it is clear that as the amount of loading of the raw material $SiO_2$ was increased from Example 1 through Example 8, the value increased, that is, the amount of formation of mullite increased.

When attention is paid to the values of the XRF molar ratio [Si]/[Al], it is clear that as the amount of loading of the raw material $SiO_2$ was increased from Example 1 through Example 8, the value of [Si]/[Al] measured by XRF increased. In contrast, when attention is paid to the values of the XRD peak intensity ratio and the XPS molar ratio [Si]/[Al], described above, it is clear that even when the amount of loading of the raw material $SiO_2$ was increased from Example 1 through Example 8, the values stopped increasing at some point. Presumably, a reason for this is that XRF analysis analyzes the entire sample, whereas XPS analyzes a region within several nanometers of the surface of the sample. That is, the fact that the value of the XPS molar ratio [Si]/[Al] did not increase indicates that the Si content of the surface of the flaky alumina particles had reached a maximum level, and, presumably, the surface layer of the flaky alumina particles in this state were in a state in which the entirety thereof was coated with mullite.

In the flaky alumina particles obtained in Examples 1 to 8, mullite was formed in the surface layer. Thus, it is indicated that in the surface layer, mullite was exclusively present, with $SiO_2$ being absent, or even when $SiO_2$ was present, mullite was present in an overwhelmingly large amount. The pH of the isoelectric point as determined by measurement of a zeta potential, at which the potential was zero, was in a range of 2 to 3, that is, the pH had shifted to the acidic side, and, therefore, presumably, high electrostatic repulsion was present, and thus, dispersion stability in an instance where the flaky alumina particles were added to a dispersion medium, such as those described above, could be enhanced on their own. In addition to the fact that the strong bond between the alumina and the mullite reduced the likelihood of their separation, assuming that the flaky alumina particles were surface-treated with an organosilane such as that described above, which was used as a coupling agent, strong bonding based on strong anchoring between the mullite and Si of the organosilane coupling agent could be expected, and further, with a selection of a functional group to be present on the side that faces Si of the organosilane coupling agent, strong bonding to a dispersion medium, such as a binder, could also be expected.

Note that in Example 8, a circular-particle-like adhering object that was believed to be a $SiO_2$ particle was observed around a flaky alumina particle. Presumably, the $SiO_2$ particle was derived from excess Si that resulted from an instance in which the formation of mullite in the surface layer of the flaky alumina particles had reached a maximum level. Accordingly, the flaky alumina particles of Examples 1 to 7 had higher quality than the flaky alumina particles of Example 8. Furthermore, presumably, the flaky alumina particles of Examples 1 to 7 also had higher thermal conductivity because the amount of excess $SiO_2$ therein was smaller than in the flaky alumina particles of Example 8.

In the embodiments described above, the constituents, combinations thereof, and the like are examples. Addition, omission, and/or substitution of one or more constituents as well as other modifications may be made without departing from the spirit of the present invention. Furthermore, the present invention is not limited to the embodiments but is only limited by the scope of the claims.

INDUSTRIAL APPLICABILITY

The present invention provides flaky alumina particles that are unlikely to wear out devices compared with flaky alumina particles of the related art. This is achieved by the presence of mullite in a surface layer of the flaky alumina particles.

The invention claimed is:

1. Flaky alumina particles comprising a surface layer in which mullite is exclusively present, wherein as determined by XRD analysis, a ratio of a peak intensity of the mullite observed at 2θ=26.2±0.2° to a peak intensity of a (104) face of α-alumina observed at 2θ=35.1±0.2° is greater than or equal to 0.02, and the flaky alumina particles have a pH of an isoelectric point of 2 to 5 as determined by measurement of a zeta potential, the isoelectric point being a point at which a potential is zero.

2. The flaky alumina particles according to claim 1, wherein a molar ratio [Si]/[Al], which is a ratio of moles of Si to moles of Al in the surface layer, as determined by XPS analysis, is greater than or equal to 0.15.

3. The flaky alumina particles according to claim 2, wherein a molar ratio [Si]/[Al], which is a ratio of moles of Si to moles of Al in the flaky alumina particles, as determined by XRF analysis, is less than or equal to 0.04.

4. The flaky alumina particles according to claim 1, wherein the flaky alumina particles have a density of 3.7 g/cm3 or greater and 4.1 g/cm3 or less.

5. The flaky alumina particles according to claim 1, wherein a molar ratio [Si]/[Al], which is a ratio of moles of Si to moles of Al in the flaky alumina particles, as determined by XRF analysis, is less than or equal to 0.04.

6. The flaky alumina particles according to claim 1, wherein the flaky alumina particles have a thickness of 0.01 to 5 μm, an average particle diameter of 0.1 to 500 μm, and an aspect ratio of 2 to 500.

7. The flaky alumina particles according to claim 1, further comprising molybdenum.

8. A method for producing the flaky alumina particles according to claim 1, the method comprising:

forming a mixture by mixing together an aluminum compound that contains elemental aluminum, a molybdenum compound that contains elemental molybdenum, and silicon or a silicon compound that contains elemental silicon, the aluminum compound being in an amount greater than or equal to 50 mass %, calculated as $Al_2O_3$, the molybdenum compound being in an amount less than or equal to 40 mass %, calculated as $MoO_3$, the silicon or the silicon compound being in an amount of 0.5 mass % or greater and less than 10 mass %, calculated as $SiO_2$, relative to a total mass of the flaky alumina particles taken as 100 mass %; and firing the mixture.

9. The method for producing the flaky alumina particles according to claim 8, wherein the mixture further includes a potassium compound.

* * * * *